(12) United States Patent
Chen et al.

(10) Patent No.: US 12,103,582 B2
(45) Date of Patent: Oct. 1, 2024

(54) STEERING WHEEL

(71) Applicant: Autoliv Development AB, Vargarda (SE)

(72) Inventors: Wenyuan Chen, Shanghai (CN); Shuhao Wang, Shanghai (CN); Ruigang Sang, Shanghai (CN)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/043,838

(22) PCT Filed: Jul. 21, 2021

(86) PCT No.: PCT/CN2021/107496
§ 371 (c)(1),
(2) Date: Mar. 2, 2023

(87) PCT Pub. No.: WO2022/052640
PCT Pub. Date: Mar. 17, 2022

(65) Prior Publication Data
US 2024/0025467 A1     Jan. 25, 2024

(30) Foreign Application Priority Data

Sep. 9, 2020   (CN) .......................... 202010941147.6

(51) Int. Cl.
*B62D 1/10* (2006.01)
*B62D 1/06* (2006.01)
*G01D 5/04* (2006.01)

(52) U.S. Cl.
CPC .................. *B62D 1/10* (2013.01); *B62D 1/06* (2013.01); *G01D 5/04* (2013.01)

(58) Field of Classification Search
None
See application file for complete search history.

(56) References Cited

U.S. PATENT DOCUMENTS

| 10,501,108 | B2 | 12/2019 | Beauregard | |
| 10,710,627 | B2* | 7/2020 | Kreutz | ..................... B62D 1/10 |
| 11,230,315 | B2* | 1/2022 | Kastelic | ................... B62D 1/08 |

FOREIGN PATENT DOCUMENTS

| CN | 105584516 A | 5/2016 |
| CN | 106627724 A | 5/2017 |
| CN | 107963113 A | 4/2018 |

(Continued)

*Primary Examiner* — Vicky A Johnson
(74) *Attorney, Agent, or Firm* — Matthew D. Thayne; Thayne and Davis LLC

(57) ABSTRACT

A steering wheel, including a steering wheel rim and a steering wheel support, the steering wheel rim being movable relative to the steering wheel support, and the steering wheel rim being mounted rotatable about a first axis of rotation. The steering wheel further includes: a pivot shaft, fixedly connected to the steering wheel rim so as to move together with the steering wheel rim, the pivoting of the pivot shaft about a second axis of rotation causing the steering wheel rim to rotate about the second axis relative to the steering wheel support, wherein the first axis is perpendicular to the second axis; and a transmission mechanism, configured to be drivingly connected to the pivot shaft and configured to transmit power to the pivot shaft when driven by a driving apparatus so that the pivot shaft pivots about the second axis.

19 Claims, 3 Drawing Sheets

(56) References Cited

FOREIGN PATENT DOCUMENTS

| | | | | |
|---|---|---|---|---|
| CN | 110962908 A | 4/2020 | | |
| CN | 111017001 A | 4/2020 | | |
| DE | 102020100016 A1 | 7/2020 | | |
| EP | 3628565 A1 * | 4/2020 | ........... | B60N 2/0244 |
| FR | 3082472 B1 | 8/2020 | | |
| WO | 2017060149 A1 | 4/2017 | | |

* cited by examiner

STEERING WHEEL

TECHNICAL FIELD

The present invention relates to a steering mechanism of a vehicle, and relates in particular to a steering wheel.

BACKGROUND

Motor vehicles are typically adjusted to a desired direction by means of front wheels thereof. A vehicle driver sets the desired direction by means of a steering wheel. To this end, a steering wheel rim is rotated such that the front wheels are directed towards the desired direction. The steering wheel rim is typically disposed in front of the chest of the vehicle driver so that the vehicle driver can grasp the steering wheel rim relatively easily. Meanwhile, the position of the steering wheel causes the driver to be limited in freedom of movement, and the driver cannot turn sideways in the seat or can only do so awkwardly. In addition, the driver is also adversely affected when getting into and out of the vehicle.

The degree of automation of vehicles today is increasingly higher so that the vehicles may move autonomously. Correspondingly, different levels of automation are distinguished for vehicles. For level 3 and above, which corresponds to highly automated driving, a driver does not need to monitor various systems for vehicle control. Thus, the driver may transfer their attention to matters of interest or have a rest. In this case, it is desirable that the steering wheel rim can be stowed to provide more space and comfort to the driver.

Accordingly, it is desirable to provide a steering wheel that can be stowed easily.

SUMMARY

The objective of the present invention is to provide a steering wheel that can be stowed easily.

Provided in the present invention is a steering wheel, comprising a steering wheel rim and a steering wheel support, wherein the steering wheel rim is movable relative to the steering wheel support, and the steering wheel rim is mounted so as to be rotatable about a first axis of rotation; wherein, the steering wheel further comprises:
a pivot shaft, configured to be fixedly connected to the steering wheel rim so as to move together with the steering wheel rim, the pivoting of the pivot shaft about a second axis of rotation causing the steering wheel rim to rotate about the second axis of rotation relative to the steering wheel support, wherein the first axis of rotation is perpendicular to the second axis of rotation; and
a transmission mechanism, configured to be drivingly connected to the pivot shaft and configured to transmit power to the pivot shaft when driven by a driving apparatus so that the pivot shaft pivots about the second axis of rotation.

According to an embodiment of the present invention, the steering wheel support comprises an accommodation cavity configured to accommodate the transmission mechanism, and a portion of the pivot shaft extends into the accommodation cavity.

According to an embodiment of the present invention, the transmission mechanism comprises a transmission shaft, and a first transmission mechanism and a second transmission mechanism arranged to be spaced apart from each other in an axial direction of the transmission shaft, the first transmission mechanism being configured to be drivingly connected to the driving apparatus so as to transmit power from the driving apparatus to the transmission shaft, and the second transmission mechanism being configured to be drivingly connected to the pivot shaft so as to transmit power from the transmission shaft to the pivot shaft.

According to an embodiment of the present invention, the first transmission mechanism comprises a worm gear and a worm, the worm gear being configured to be drivingly connected to the driving apparatus, and the transmission shaft being configured to be the worm.

According to an embodiment of the present invention, the second transmission mechanism is configured to be a first gear and a second gear meshing with each other, the first gear being configured to be fixed on the transmission shaft, and the second gear being configured to be fixed on the pivot shaft.

According to an embodiment of the present invention, the steering wheel further comprises a fixed shaft fixed to the steering wheel rim, wherein the steering wheel support is provided with a track configured to guide the movement of the pivot shaft, and the pivot shaft moves, under the action of the power transmitted by the second transmission mechanism, along the track, so that the pivot shaft pivots about the fixed shaft.

According to an embodiment of the present invention, the second transmission mechanism is configured to be a first connecting rod and a second connecting rod connected to each other at end portions thereof, wherein the first connecting rod is configured such that one end thereof is fixed to the transmission shaft, and the second connecting rod is configured such that one end thereof is fixed to the pivot shaft.

According to an embodiment of the present invention, the second transmission mechanism is configured to be a third gear and a gear rack meshing with each other, the third gear being configured to be fixed to the transmission shaft, and the gear rack being disposed on the track.

According to an embodiment of the present invention, a self-locking device is further provided, and is configured to lock the position of the steering wheel rim relative to the steering wheel support.

According to an embodiment of the present invention, the self-locking device comprises a retractable pin and positioning holes disposed on the accommodation cavity, and when the retractable pin is positioned in the positioning holes, the position of the steering wheel rim relative to the steering wheel support is locked.

According to an embodiment of the present invention, an angle measurement device is further provided, and is configured to measure an angle of rotation of the steering wheel rim relative to the steering wheel support.

According to an embodiment of the present invention, the angle measurement device is configured to determine the angle of rotation of the steering wheel rim relative to the steering wheel support by measuring an angle of rotation of the transmission shaft.

According to an embodiment of the present invention, the angle measurement device comprises a first measurement gear and a second measurement gear meshing with each other, the first measurement gear being fixed to the transmission shaft, and the second measurement gear being connected to a sensor of the angle measurement device.

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where.

DETAILED DESCRIPTION

Figure 1A:
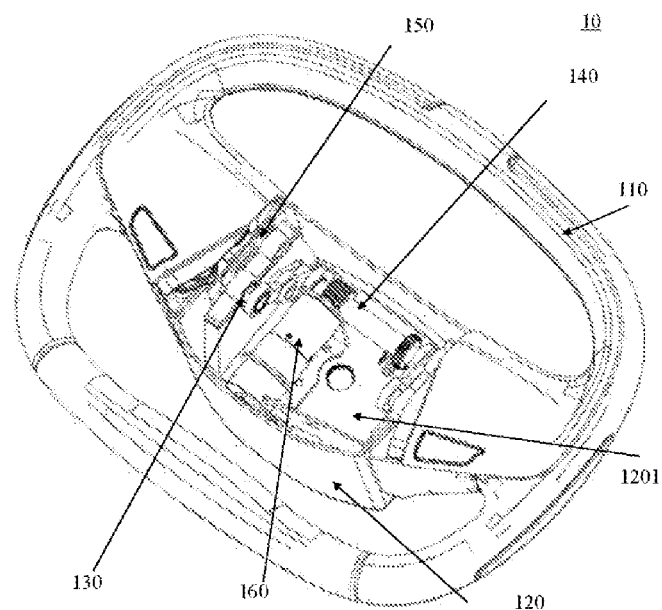
FIGS. 1(a) to 1(c) illustrate a steering wheel according to a first embodiment of the present invention.

Specific implementations of a steering wheel according to the present invention will be described below with reference to the accompanying drawings. The following detailed description and the accompanying drawings are used to illustratively explain the principles of the present invention. The present invention is not limited to the described preferred embodiments, and the protection scope of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

Figure 1B:
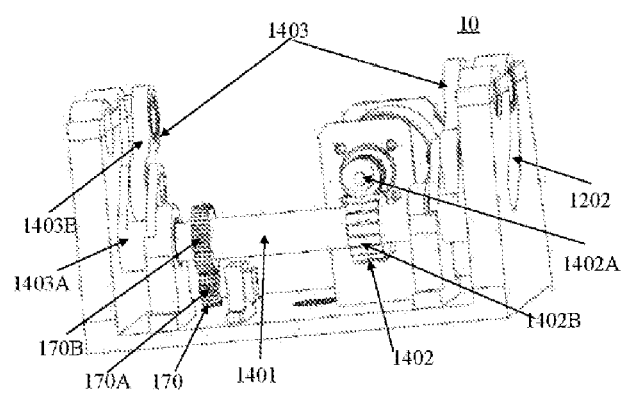
Figure 1C:
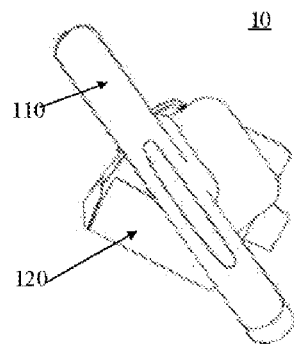

FIGS. 1(a) to 1(c) illustrate a steering wheel according to a first embodiment of the present invention. The steering wheel according to the first embodiment of the present invention is described below with reference to FIGS. 1(a) to 1(c).

As shown in FIG. 1(a), the steering wheel 10 according to the first embodiment of the present invention includes a steering wheel rim 110 and a steering wheel support 120. The steering wheel rim 110 is movable relative to the steering wheel support 120, and the steering wheel rim 110 is mounted so as to be rotatable about a first axis of rotation. In the steering wheel 10 shown in FIG. 1(a), the first axis of rotation in FIG. 1(a) is substantially perpendicular to the plane of the paper, and rotating the steering wheel rim 110 about the first axis of rotation can be construed as setting a desired travel direction of a vehicle.

With continued reference to FIG. 1(a), the steering wheel 10 further includes a pivot shaft 130 configured to be fixedly connected to the steering wheel rim 110 so as to move together with the steering wheel rim 110. Specifically, in the steering wheel 10 shown in FIG. 1(a), the pivot shaft 130 is fixedly connect to a spoke of the steering wheel rim 110. However, this is merely an example, and the pivot shaft can be configured, according to actual conditions, to be fixedly connected to a peripheral portion of the steering wheel rim. In addition, as shown in FIG. 1(c), the pivoting of the pivot shaft 130 about a second axis of rotation causes the steering wheel rim 110 to rotate about the second axis of rotation relative to the steering wheel support 120. The second axis of rotation in FIG. 1(c) is substantially perpendicular to the plane of the paper, and the first axis of rotation is perpendicular to the second axis of rotation. It can be understood that when the steering wheel is in the state shown in FIG. 1(c) where the steering wheel rim is folded relative to the steering wheel support, the steering wheel occupies a smaller space than when in the state shown in FIG. 1(a).

Therefore, the state shown in FIG. 1(c) may also be referred to as a stowed state of the steering wheel. This facilitates provision of more space and comfort to a driver.

With continued reference to FIG. 1(a), the steering wheel 10 further includes a transmission mechanism 140 configured to be drivingly connected to the pivot shaft 130 and configured to transmit power to the pivot shaft 130 when driven by a driving apparatus 160 so that the pivot shaft 130 pivots about the second axis of rotation. In an example, the driving apparatus is configured to be an electric motor. However, this is merely an example, and the driving apparatus may also be other types of driving apparatuses.

In this embodiment, the steering wheel support 120 includes an accommodation cavity 1201 configured to accommodate the transmission mechanism 140, and a portion of the pivot shaft 130 extends into the accommodation cavity 1201. It can be understood that this is merely an example, and the steering wheel of the present invention is not limited thereto. For example, the transmission mechanism may also be disposed outside the steering wheel support. The transmission mechanism 140 is described in detail below with reference to FIG. 1(b).

As shown in FIG. 1(b), the transmission mechanism 140 includes a transmission shaft 1401, and a first transmission mechanism 1402 and a second transmission mechanism 1403 arranged to be spaced apart from each other in an axial direction of the transmission shaft 1401. The first transmission mechanism 1402 is configured to be drivingly connected to the driving apparatus 160 so as to transmit power from the driving apparatus 160 to the transmission shaft 140, and the second transmission mechanism 1403 is configured to be drivingly connected to the pivot shaft 130 so as to transmit power from the transmission shaft 140 to the pivot shaft 130. It can be seen clearly from FIG. 1(b) that two second transmission mechanisms 1403 are respectively disposed at two ends of the transmission shaft 1401 so as to be separately connected to one pivot shaft 130. It should be noted that this is merely an example. For example, in some cases, only one second transmission mechanism and one pivot shaft may be provided.

With continued reference to FIG. 1(b), the first transmission mechanism 1402 includes a worm gear 1402A and a worm 1402B. The worm gear 1402A is configured to be drivingly connected to the driving apparatus 160, and the transmission shaft 1401 is configured to be the worm 1402B.

Referring back to FIG. 1(a), the steering wheel 10 further includes a fixed shaft 150 fixed to the steering wheel rim 110, and the pivot shaft 130 can pivot, under the action of the transmission mechanism 140, about the fixed shaft 150. In other words, the second axis of rotation coincides with the fixed shaft 150 (or an axis thereof). Correspondingly, as shown in FIG. 1(b), the steering wheel support 120 is provided with a track 1202 configured to guide the movement of the pivot shaft 130, and the pivot shaft 130 moves, under the action of the power transmitted by the second transmission mechanism 1402, along the track 1202, so that the pivot shaft 130 pivots about the fixed shaft 150.

With continued reference to FIG. 1(b), in this embodiment, the second transmission mechanism 1403 is configured to be a first connecting rod 1403A and a second connecting rod 1403B connected to each other at end portions thereof. The first connecting rod 1403A is configured such that one end thereof is fixed to the transmission shaft 1401, and the second connecting rod 1403B is configured such that one end thereof is fixed to the pivot shaft 130. In other words, one end of the first connecting rod 1403A is connected to the second connecting rod 1403B, and the other end thereof is fixed to the transmission shaft 1401; one end of the second connecting rod 1403B is connected to the first connecting rod 1403A, and the other end thereof is fixed to the pivot shaft 130. Further, a self-locking function of a linkage mechanism can be utilized to lock the position of the steering wheel rim relative to the steering wheel support.

Optionally, as shown in FIG. 1(*b*), the steering wheel 10 is further provided with an angle measurement device 170 configured to measure an angle of rotation of the steering wheel rim 110 relative to the steering wheel support 120. It can be understood that the angle of rotation of the steering wheel rim relative to the steering wheel support measured by the angle measurement device 170 may be displayed via a display device, or used as an input signal for further control or adjustment of the steering wheel performed by a controller. In an exemplary embodiment, the angle measurement device 170 is configured to determine the angle of rotation of the steering wheel rim 110 relative to the steering wheel support 120 by measuring an angle of rotation of the transmission shaft 1401. Correspondingly, the angle measurement device 170 includes a first measurement gear 170B and a second measurement gear 170A meshing with each other. The first measurement gear 170B is fixed to the transmission shaft 1401, and the second measurement gear 170A is connected to a sensor of the angle measurement device 170. The sensor of the angle measurement device 170 measures an angle of rotation of the first measurement gear 170B and correspondingly the angle of rotation of the transmission shaft 1401 by measuring an angle of rotation of the second measurement gear 170A. As an alternative, the angle measurement device may omit the two measurement gears, and may be directly disposed on the transmission shaft.

Figure 2A:
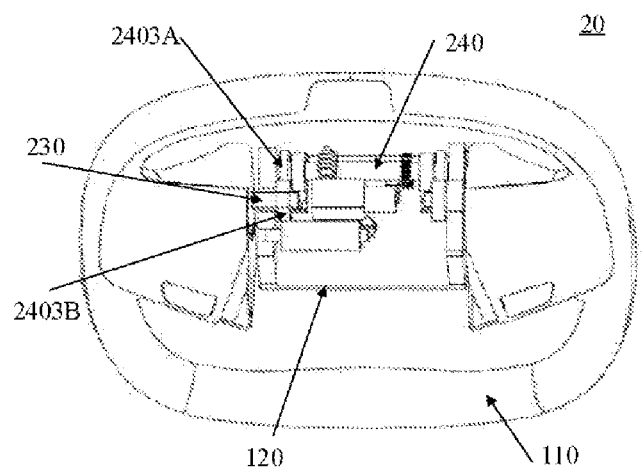
FIGS. 2(a) to 2(c) illustrate a steering wheel according to a second embodiment of the present invention.
Figure 2B:
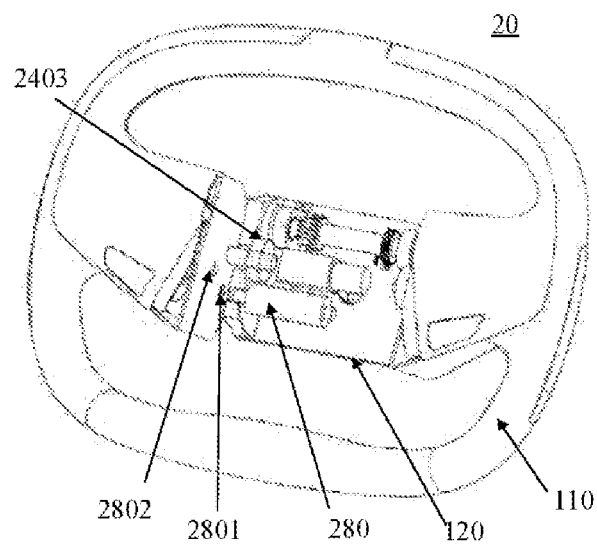
Figure 2C:
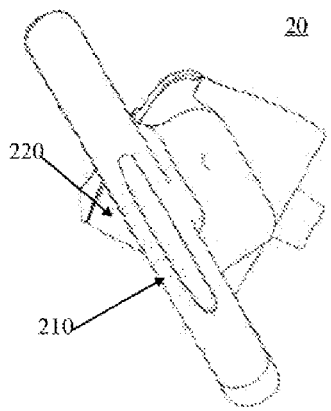

FIGS. 2(*a*) to 2(*c*) illustrate a steering wheel according to a second embodiment of the present invention. The steering wheel according to the second embodiment of the present invention is described below with reference to FIGS. 2(*a*) to 2(*c*). It should be noted that the difference between the second embodiment to be described and the first embodiment described above mainly lies in the transmission mechanism.

As shown in FIG. 2(*a*), the steering wheel 20 according to the second embodiment of the present invention includes a steering wheel rim 110 and a steering wheel support 120. The steering wheel rim 110 is movable relative to the steering wheel support 120, and the steering wheel rim 110 is mounted so as to be rotatable about a first axis of rotation. As already described, rotating the steering wheel rim 110 about the first axis of rotation can be construed as setting a desired travel direction of a vehicle. With continued reference to FIG. 2(*a*), the steering wheel 20 further includes a pivot shaft 130 configured to be fixedly connected to the steering wheel rim 110 so as to move together with the steering wheel rim 110. Specifically, in the steering wheel 20 shown in FIG. 2(*a*), the pivot shaft 130 is fixedly connect to a spoke of the steering wheel rim 110. In addition, as shown in FIG. 2(*c*), the pivoting of the pivot shaft 130 in FIG. 2(*a*) about a second axis of rotation causes the steering wheel rim 110 to rotate about the second axis of rotation relative to the steering wheel support 120. The second axis of rotation in FIG. 2(*c*) is substantially perpendicular to the plane of the paper, and the first axis of rotation is perpendicular to the second axis of rotation.

With continued reference to FIG. 2(*a*), the steering wheel 20 further includes a transmission mechanism 240. The transmission mechanism 240 includes a first transmission mechanism and a second transmission mechanism 2403. The description provided with reference to the first transmission mechanism 1402 in the first embodiment is applicable to the first transmission mechanism in the second embodiment. The second transmission mechanism 2403 is described in detail below. As illustrated, the second transmission mechanism 2403 is configured to be a first gear 2403A and a second gear 2403B meshing with each other. The first gear 2403A is configured to be fixed on the transmission shaft, and the second gear 2403B is configured to be fixed on the pivot shaft 130. It can be understood that in this embodiment, the second axis of rotation coincides with the pivot shaft 130 (or an axis thereof).

As shown in FIG. 2(*b*), in this embodiment, the steering wheel 20 is further provided with a self-locking device 280 configured to lock the position of the steering wheel rim 110 relative to the steering wheel support 120. In an example, the self-locking device 280 includes a retractable pin and positioning holes 2801, 2802 disposed on the accommodation cavity, and when the retractable pin is positioned in the positioning holes 2801, 2802, the position of the steering wheel rim 110 relative to the steering wheel support 120 is locked. For example, when the retractable pin is positioned in the positioning hole 2801, the steering wheel rim 110 is locked in a first position relative to the steering wheel support 120, and the first position may be a position shown in FIG. 2(*b*). And, for example, when the retractable pin is positioned in the positioning hole 2802, the steering wheel rim 110 is locked in a second position relative to the steering wheel support 120, and the second position may be a position shown in FIG. 2(*c*). In an example, the retractable pin may be configured to be an electromagnetic switch. However, this is merely an example, and the retractable pin may also be driven in another manner.

Figure 3A:
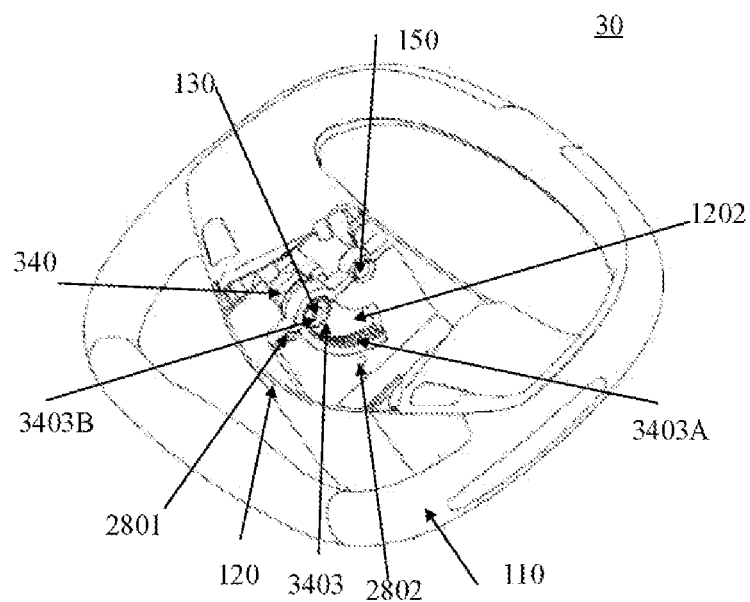
FIGS. 3(a) and 3(b) illustrate a steering wheel according to a third embodiment of the present invention.
Figure 3B:
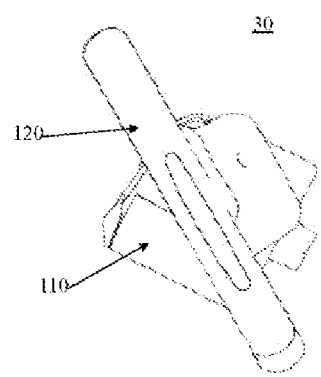

FIGS. 3(*a*) and 3(*b*) illustrate a steering wheel according to a third embodiment of the present invention. The steering wheel according to the third embodiment of the present invention is described below with reference to FIGS. 3(*a*) and 3(*b*). It should be noted that the difference between the third embodiment to be described and the first embodiment described above mainly lies in the transmission mechanism.

As shown in FIG. 3(*a*), the steering wheel 30 according to the third embodiment of the present invention includes a steering wheel rim 110 and a steering wheel support 120. The steering wheel rim 110 is movable relative to the steering wheel support 120, and the steering wheel rim 110 is mounted so as to be rotatable about a first axis of rotation. As already described, rotation of the steering wheel rim 110 about the first axis of rotation can be construed as setting a desired travel direction of a vehicle. With continued reference to FIG. 3(*a*), the steering wheel 30 further includes a pivot shaft 130 configured to be fixedly connected to the steering wheel rim 110 so as to move together with the steering wheel rim 110. Specifically, in the steering wheel 20 shown in FIG. 3(*a*), the pivot shaft 130 (which is the same component as the transmission shaft 1401 in this embodiment) is fixedly connect to a spoke of the steering wheel rim 110. In addition, as shown in FIG. 3(*b*), the pivoting of the pivot shaft 130 in FIG. 3(*a*) about a second axis of rotation causes the steering wheel rim 110 to rotate about the second axis of rotation relative to the steering wheel support 120. The second axis of rotation in FIG. 3(*b*) is substantially perpendicular to the plane of the paper, and the first axis of rotation is perpendicular to the second axis of rotation.

With continued reference to FIG. 3(*a*), the steering wheel 30 further includes a transmission mechanism 340. The transmission mechanism 340 includes a first transmission mechanism and a second transmission mechanism 3403. The description provided with reference to the first transmission mechanism 1402 in the first embodiment is applicable to the first transmission mechanism in the second embodiment. The second transmission mechanism 3403 is described in detail below. As illustrated, the second transmission mechanism 3403 is configured to be a third gear 3403B and a gear rack 3403A meshing with each other. The third gear 3403B is configured to be fixed to the transmission shaft 1401, and the gear rack 3403A is disposed on the track 1202.

As shown in FIG. 3(*a*), in this embodiment, the steering wheel 30 is further provided with a self-locking device 280 configured to lock the position of the steering wheel rim 110 relative to the steering wheel support 120. The description provided with reference to the self-locking device 280 in the second embodiment is applicable to the self-locking device in the third embodiment. Specifically, FIG. 3(*a*) shows only two positioning holes of the self-locking device. When the retractable pin is positioned in the positioning holes 2801, 2802, the position of the steering wheel rim 110 relative to the steering wheel support 120 is locked. For example, when the retractable pin is positioned in the positioning hole 2801, the steering wheel rim 110 is locked in a first position relative to the steering wheel support 120, and the first position may be a position shown in FIG. 3(*a*). And, for example, when the retractable pin is positioned in the positioning hole 2802, the steering wheel rim 110 is locked in a second position relative to the steering wheel support 120, and the second position may be a position shown in FIG. 3(*b*).

Referring back to FIG. 3(*a*), the steering wheel 30 further includes a fixed shaft 150 fixed to the steering wheel rim 110, and the pivot shaft 130 can pivot, under the action of the transmission mechanism 140, about the fixed shaft 150. In other words, the second axis of rotation coincides with the fixed shaft 150 (or an axis thereof).

Therefore, in the steering wheel of the present invention, the pivot shaft and the transmission mechanism drivingly connected to the pivot shaft are provided, and the pivot shaft is configured to be fixedly connected to the steering wheel rim so as to move together with the steering wheel rim, so that the pivoting of the pivot shaft about the second axis of rotation causes the steering wheel rim to rotate about the second axis of rotation relative to the steering wheel support so as to be stowed. Therefore, the steering wheel of the present invention can be stowed easily.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel, comprising a steering wheel rim and a steering wheel support, the steering wheel rim being movable relative to the steering wheel support, and the steering wheel rim being mounted so as to be rotatable about a first axis of rotation, wherein, the steering wheel further comprises:

a pivot shaft, configured to be fixedly connected to the steering wheel rim so as to move together with the steering wheel rim, the pivoting of the pivot shaft about a second axis of rotation causing the steering wheel rim to rotate about the second axis of rotation relative to the steering wheel support, wherein the first axis of rotation is perpendicular to the second axis of rotation; and a transmission mechanism, configured to be drivingly connected to the pivot shaft and configured to transmit power to the pivot shaft when driven by a driving apparatus so that the pivot shaft pivots about the second axis of rotation, wherein the transmission mechanism comprises:

a transmission shaft;

a first transmission mechanism; and a second transmission mechanism spaced apart from the first transmission mechanism so as to transmit power from the driving apparatus to the transmission shaft.

2. The steering wheel according to claim 1, wherein the steering wheel support comprises an accommodation cavity configured to accommodate the transmission mechanism, and a portion of the pivot shaft extends into the accommodation cavity.

3. The steering wheel according to claim 2, wherein the first transmission mechanism and the second transmission mechanism are spaced apart from each other in an axial direction of the transmission shaft, the first transmission mechanism being configured to be drivingly connected to the driving apparatus so as to transmit power from the driving apparatus to the transmission shaft, and the second transmission mechanism being configured to be drivingly connected to the pivot shaft so as to transmit power from the transmission shaft to the pivot shaft.

4. The steering wheel according to claim 3, wherein the first transmission mechanism comprises a worm gear and a worm, the worm gear being configured to be drivingly connected to the driving apparatus, and the transmission shaft being configured to be the worm.

5. The steering wheel according to claim 4, wherein the second transmission mechanism is configured to be a first gear and a second gear meshing with each other, the first gear being configured to be fixed on the transmission shaft, and the second gear being configured to be fixed on the pivot shaft.

6. The steering wheel according to claim 4, further comprising a fixed shaft fixed to the steering wheel rim, wherein the steering wheel support is provided with a track configured to guide the movement of the pivot shaft, and the pivot shaft moves, under the action of the power transmitted by the second transmission mechanism, along the track, so that the pivot shaft pivots about the fixed shaft.

7. The steering wheel according to claim 6, wherein the second transmission mechanism is configured to be a first connecting rod and a second connecting rod connected to each other at end portions thereof, wherein the first connecting rod is configured such that one end thereof is fixed to the transmission shaft, and the second connecting rod is configured such that one end thereof is fixed to the pivot shaft.

8. The steering wheel according to claim 6, wherein the second transmission mechanism is configured to be a third gear and a gear rack meshing with each other, the third gear being configured to be fixed to the transmission shaft, and the gear rack being disposed on the track.

9. The steering wheel according to claim 7, wherein a self-locking device is further provided, and is configured to lock the position of the steering wheel rim relative to the steering wheel support.

10. The steering wheel according to claim 9, wherein the self-locking device comprises a retractable pin and positioning holes disposed on the accommodation cavity, and when the retractable pin is positioned in the positioning holes, the position of the steering wheel rim relative to the steering wheel support is locked.

11. The steering wheel according to claim 10, wherein an angle measurement device is further provided, and is configured to measure an angle of rotation of the steering wheel rim relative to the steering wheel support.

12. The steering wheel according to claim 11, wherein the angle measurement device is configured to determine the angle of rotation of the steering wheel rim relative to the steering wheel support by measuring an angle of rotation of the transmission shaft.

13. The steering wheel according to claim 12, wherein the angle measurement device comprises a first measurement gear and a second measurement gear meshing with each other, the first measurement gear being fixed to the transmission shaft, and the second measurement gear being connected to a sensor of the angle measurement device.

14. The steering wheel according to claim 8, wherein a self-locking device is further provided, and is configured to lock the position of the steering wheel rim relative to the steering wheel support.

15. The steering wheel according to claim 14, wherein the self-locking device comprises a retractable pin and positioning holes disposed on the accommodation cavity, and when the retractable pin is positioned in the positioning holes, the position of the steering wheel rim relative to the steering wheel support is locked.

16. The steering wheel according to claim 15, wherein an angle measurement device is further provided, and is configured to measure an angle of rotation of the steering wheel rim relative to the steering wheel support.

17. The steering wheel according to claim 16, wherein the angle measurement device is configured to determine the angle of rotation of the steering wheel rim relative to the steering wheel support by measuring an angle of rotation of the transmission shaft.

18. The steering wheel according to claim 17, wherein the angle measurement device comprises a first measurement gear and a second measurement gear meshing with each other, the first measurement gear being fixed to the transmission shaft, and the second measurement gear being connected to a sensor of the angle measurement device.

19. A steering wheel, comprising a steering wheel rim and a steering wheel support, the steering wheel rim being movable relative to the steering wheel support, and the steering wheel rim being mounted so as to be rotatable about a first axis of rotation,
wherein,
the steering wheel further comprises:
  a pivot shaft, configured to be fixedly connected to the steering wheel rim so as to move together with the steering wheel rim, the pivoting of the pivot shaft about a second axis of rotation causing the steering wheel rim to rotate about the second axis of rotation relative to the steering wheel support, wherein the first axis of rotation is perpendicular to the second axis of rotation; and
  a transmission mechanism, configured to be drivingly connected to the pivot shaft and configured to transmit power to the pivot shaft when driven by a driving apparatus so that the pivot shaft pivots about the second axis of rotation,
    wherein the steering wheel support comprises an accommodation cavity configured to accommodate the transmission mechanism, and a portion of the pivot shaft extends into the accommodation cavity, and
    wherein the transmission mechanism comprises a transmission shaft, and a first transmission mechanism and a second transmission mechanism arranged to be spaced apart from each other in an axial direction of the transmission shaft, the first transmission mechanism being configured to be drivingly connected to the driving apparatus so as to transmit power from the driving apparatus to the transmission shaft, and the second transmission mechanism being configured to be drivingly connected to the pivot shaft so as to transmit power from the transmission shaft to the pivot shaft.

* * * * *